Sept. 12, 1950  H. E. HARTIG  2,521,915
CALCULATOR
Filed Sept. 8, 1943

INVENTOR
Henry E. Hartig
BY William Jones
ATTORNEY

Patented Sept. 12, 1950

2,521,915

UNITED STATES PATENT OFFICE 2,521,915

CALCULATOR

Henry E. Hartig, San Diego, Calif., assignor to the United States of America as represented by the Secretary of the Navy Application September 8, 1943, Serial No. 501,573

2 Claims. (Cl. 235—83)

This invention relates to a calculator.

It has often proved very desirable to have available some means for rapidly determining a certain intermediate point lying between and which bears a certain predetermined relation to two known points. It is one of the objects of this invention to provide such means.

For example, in all kinds of echo-ranging equipment, the operator is often provided with two readings or bearings, as the receiver is "swept" across the target whose position is sought. These two points are conventionally known as the "cut-on" and "cut-off" bearings, and determine the angle in which the target lies as evidenced by the presence of an echo in that sector.

If such a target proves to be one which is desirable to attack, such as a submarine, it is of utmost importance that an intermediate bearing be obtained at which precise bearing the attack is to be directed. This must be done as quickly as possible as the few seconds taken to make the arithmetic calculation may well spell the difference between failure and a successful attack. Depending upon the aspect of the target, i. e., the angle which its major axis bears to the searching ship, this intermediate bearing may be half way between the "cut-on" and "cut-off" bearings, or at some fractional part of the angle included between the two known bearings. Thus, it is another of the objects of this invention to quickly determine such an intermediate bearing.

Additionally, with respect to the problem just stated, it is also found that the position of this intermediate bearing may vary depending upon the size of the angle subtended between the two known bearings. The invention disclosed enables the rapid determination of such a varying intermediate bearing as well.

The objects mentioned above are not by any means all inclusive for the invention may be utilized in any case where it is necessary to find an intermediate value which bears a predetermined relationship to two known values, whether such values are angles, distances, pure numbers, logarithms, etc. The relationship need not be one in which the intermediate difference between one of the known values and the intermediate value is constant or bears a constant ratio to the difference value between the two known values. It is sufficient if such intermediate difference is some mathematical function of the difference value. All that is necessary is that such function be known and the calculator can then be so arranged to provide the intermediate value in an exceedingly short space of time.

Figure 1:
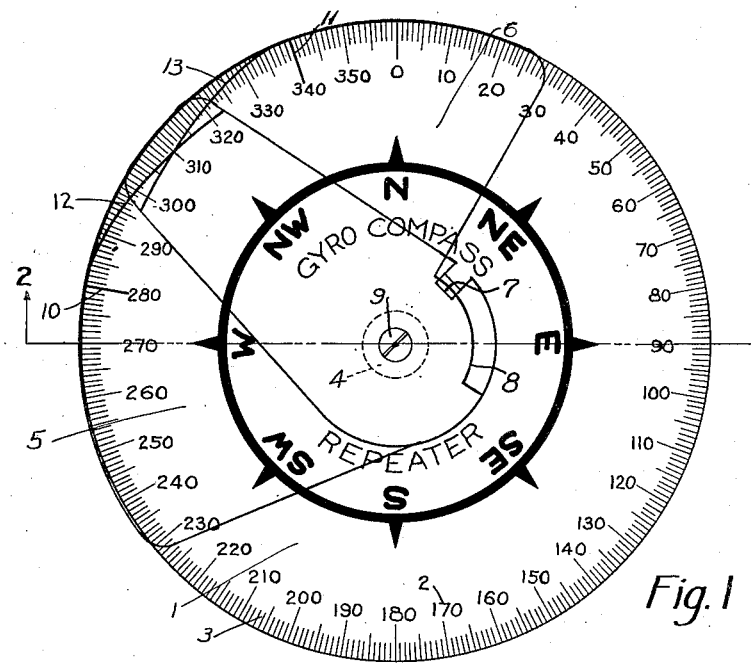
Figure 1 is a plan view of one form of the invention.

As has been shown, the invention may be used for a variety of purposes. In Fig. 1 is shown a form of the device which is very useful in determining bisecting bearings and which might be used in echo-ranging.

In this form of the invention, a circular card 1, which may be of metal, paper, plastic or other desirable material, is printed to resemble a gyrocompass repeater dial, of the type used on ship compasses. The card bears both the directions of the compass and printed numbers 2, in connection with a circumferential bearing scale 3 divided into 360°. It should be noted at this point that the particular scale used depends upon the use to be made of the calculator. Instead of bearing angles, pure numbers, logarithms or any other desired scale might be used.

Figure 2:
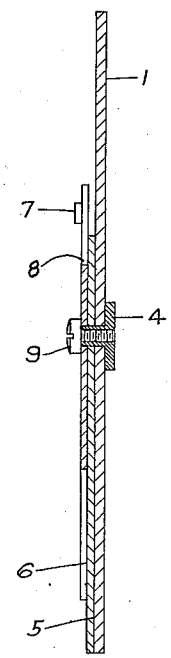
Figure 2 is a sectional view of the same form along the line 2—2 of Fig. 1.

A small hole is punched through the center of the card, as shown in Fig. 2, to receive an internally threaded rivet 4, the head of which extends through and above the printed surface of the card 1.

Two transparent arms 5, 6, formed of any convenient material, are mounted one above the other for rotation about rivet 4. These arms are generally sector shaped, as shown in Fig. 1, and their outside edges coincide with the circumference of card 1. The arm 5 is provided with an upturned ear 7 which is adapted to fold over the edge of a slot, as at 8, in arm 6 and acts as a stop to govern the angular distance which the arms may rotate with respect to each other. A small screw 9 is adapted to engage the internal threads on rivet 4 to hold the arms 5, 6 in position.

Two radial index lines 10, 11 are laid off on arms 5 and 6, respectively, and extend short distances radially inward from points located near the center of the circumferential edge of the respective arms. Adjacent index line 10, an arc 12 is marked off on arm 5, which arc extends from a point on the circumferential edge of the arm, at or near the outer end of the index line, in a direction curving toward the index line on arm 6 and away from the circumferential edge. A similar arc 13 is marked on arm 6 extending generally toward the index line 10 on arm 5.

The device as described is exceedingly simple to use. When the "cut-on" and "cut-off" bearings are determined, the operator positions arm 5 so that index line 10 lies on one of such bearings. Holding arm 5 in place, arm 6 is rotated until index line 11 is positioned on the other of said bearings. The bisecting bearing is then determined by simply reading the bearing at which arc 13 intersects arc 12.

In the form of the device illustrated in Figs. 1 and 2, arcs 12 and 13 are curves which are mirror images of one another and may conveniently be arcs of circles. Their parameters are determined only by the angular separation of the given bearings and the radial distance from the circumference of card 1 at which the intersection of arcs 12, 13 can be conveniently read on scale 3.

Figure 3:
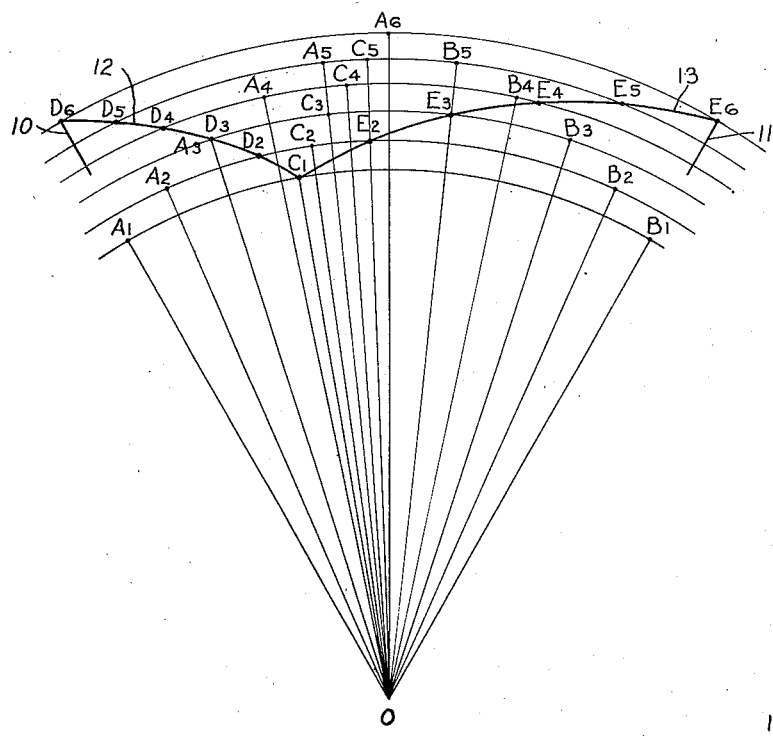
Figure 3 is a sketch illustrating how the intersecting arcs are determined.

As was set forth in the objects of the invention above, the invention is not limited to the determination of a bisecting bearing or value. If arcs 12, 13 are properly determined, an intermediate value, which divides the difference between the given values into fractional parts which may or may not retain a constant ratio with respect to one another as the difference between the given values changes, can be obtained. Fig. 3 shows an empirical method of determining such curves. In this illustration, it is assumed desirable to divide the difference between the given values into fractional parts, one of which is equal to twice the other, regardless of variation in the magnitude of such difference value. However, the method of determination obviously can be used for any desired division so long as it is no more than some function of the said difference value.

In Fig. 3, 0 represents the center of the card about which the arms rotate; and it is desired to determine the point which divides the difference value into fractional parts bearing a 2:1 ratio to one another, for all values of the difference between zero and that represented by arc $A_1B_1$. As an example, angle $A_1OB_1$ may be taken equal to 60°.

Thus, when the index lines 10 and 11 are set upon the values represented by points $A_1$ and $B_1$, the arcs 12, 13 which are to be drawn must intersect at a point one third the value $A_1B_1$, measured from $A_1$. To determine this, the arc $A_1B_1$ is drawn, with 0 as a center and with a radius great enough so that a point on it may be positioned conveniently near the scale 3 on which it would be read. The point $C_1$, one third the value $A_1B_1$ measured from $A_1$ is easily determined with a protractor and marked on arc $A_1B_1$ as shown. Another point of intersection $C_2$ is chosen by choosing another difference value and representing it as arc $A_2B_2$. The position of this arc $A_2B_2$ is determined by locating it centrally of arc $A_1B_1$ with a radius slightly greater than that used to draw arc $A_1B_1$. Point $C_2$ is then located one third the value represented by $A_2B_2$ from point $A_2$, as point $C_1$ was similarly located. In the same manner, points $C_3$, $C_4$ and $C_5$ are determined on arcs $A_3B_3$, $A_4B_4$ and $A_5B_5$, respectively, as the arcs grow progressively smaller. Corresponding points $A_6$, $B_6$ and $C_6$ necessarily coincide and are all designated as $A_6$, since the arc length and thus the difference value in this case are zero. Points $C_1$, $C_2$, $C_3$, $C_4$, $C_5$ and $A_6$, then, determine the points at which the arcs 12, 13 must intersect to give the required division.

In drawing the arcs 12, 13, it is known that when the index lines 10 and 11 are positioned at points $A_1$ and $B_1$, respectively, point $C_1$ must lie on each arc. When the index lines are positioned at points $A_2$ and $B_2$, point $C_2$ must lie on each arc, and so on, considering points $C_3$, $C_4$, $C_5$ and $A_6$. However, before the index lines 10 and 11 are moved from $A_1$ to $A_2$ and from $B_1$ to $B_2$, respectively, the points $D_2$, $E_2$ on the arcs 12, 13, which will actually coincide on such intersection, lie on opposite sides of point $C_2$ an angular amount equal to the angles $A_1OB_2$ and $B_1OB_2$. Thus, angle $C_2OD_2$ is equal to angle $A_1OA_2$ and angle $C_2OE_2$ is equal to angle $B_1OB_2$. Similarly, other points, $D_3$, $D_4$, $D_5$ and $D_6$, are found to determine arc 12 and points $E_3$, $E_4$, $E_5$ and $E_6$, are found to determine arc 13. The arcs 12 and 13 may now be drawn through the points $C_1$, $D_2$, $D_3$, $D_4$, $D_5$, $D_6$ and $C_1$, $E_2$, $E_3$, $E_4$, $E_5$, $E_6$, respectively.

Since the method of determining the arcs 12, 13 is empirical, any fractional value other than one third the difference value may be chosen; or the fractional value may vary as any function of the difference value. In any case the empirical method gives correct values, even though the fractional division desired is different for every difference value. Thus, if arc $A_xB_x$ be taken as a general value, the point $C_x$ is determined by whatever relation it bears to points $A_x$ and $B_x$ for the particular value represented by arc $A_xB_x$.

Ordinarily, one set of arcs or curves is sufficient for each calculator, but changing conditions may make it desirable to place a series of curves or a family of curves on the same set of arms together with appropriate written or color designation of the particular use of each. Similarly, it is a simple procedure to substitute new arms having other arcs by removing screw 9 from rivet 4.

The calculator herein described is one which has already found wide use by such organizations as the U. S. Navy where rapidity of calculation is imperative. It provides the only known means for making such fractional or divisional calculation without resort to complicated tables or long-hand calculation methods, the former of which is very slow and the latter of which is subject to serious errors, particularly when made under unfavorable conditions.

Having described my invention, I claim:

1. A calculator comprising: a scale; first indicator means mounted for movement along said scale in a plane closely adjacent and parallel to the plane of said scale; second indicator means mounted for movement along said scale in a plane between the plane of the scale and the plane of movement of said first indicator means; said first and second indicator means arranged and adapted to intersect at a point above and readable on said scale; and means interconnecting said first and second indicating means for limited relative movements and concerted movement over said scale whereby the two indicators are maintained in proper indicating relationship, said indicator means each comprising a line and one of the lines being a mirror image of the other modified as to projectional distance along said scale.

2. A calculator comprising: a scale; a pair of movable index points arranged and adapted to be set at two points on said scale; a first indicator member mounted for movement along said scale with one of said index points; a second indicator member mounted for movement along said scale with the other of said pair of index points; said indicator members being positioned one above the other for intersection over said scale and comprising lines having curvatures variable at will relative to each other, the curvature of the second indicator line relative to the first indicator line for any given curvature value of the first line being such as to develop a constant ratio between the projections of said lines on a circular arc including the point of line intersection, for any given point of intersection.

HENRY E. HARTIG.

REFERENCES CITED

The following references are of record in the file of this patent:

UNITED STATES PATENTS

| Number | Name | Date |
|---|---|---|
| 1,397,944 | Dalzell | Nov. 22, 1921 |
| 1,435,422 | Schiske | Nov. 14, 1922 |
| 1,954,723 | Cloud | Apr. 10, 1934 |
| 2,388,582 | Sorensen | Nov. 6, 1945 |

FOREIGN PATENTS

| Number | Country | Date |
|---|---|---|
| 292,223 | Great Britain | June 14, 1928 |
| 389,910 | Great Britain | Mar. 30, 1933 |
| 428,216 | Germany | Apr. 28, 1926 |